United States Patent
Fujimori et al.

(10) Patent No.: US 11,511,996 B2
(45) Date of Patent: Nov. 29, 2022

(54) CARBON NANOTUBE COMPOSITE, METHOD FOR MANUFACTURING THE SAME, AND METHOD FOR MANUFACTURING REFINED CARBON NANOTUBE

(71) Applicants: SUMITOMO ELECTRIC INDUSTRIES, LTD., Osaka (JP); UNIVERSITY OF TSUKUBA, Tsukuba (JP)

(72) Inventors: Toshihiko Fujimori, Osaka (JP); Takeshi Hikata, Osaka (JP); Soichiro Okubo, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 0 days.

(21) Appl. No.: 17/272,802

(22) PCT Filed: Aug. 29, 2019

(86) PCT No.: PCT/JP2019/033993
§ 371 (c)(1),
(2) Date: Mar. 2, 2021

(87) PCT Pub. No.: WO2020/050140
PCT Pub. Date: Mar. 12, 2020

(65) Prior Publication Data
US 2021/0214228 A1    Jul. 15, 2021

(30) Foreign Application Priority Data
Sep. 3, 2018 (JP) .............. JP2018-164908

(51) Int. Cl.
*C01B 32/168* (2017.01)
*B82Y 40/00* (2011.01)
*B82Y 30/00* (2011.01)

(52) U.S. Cl.
CPC .............. *C01B 32/168* (2017.08); *B82Y 30/00* (2013.01); *B82Y 40/00* (2013.01);
(Continued)

(58) Field of Classification Search
CPC .............. C01B 32/159; C01B 2202/00; Y10T 428/2991; B82Y 30/00; B82Y 35/00; B82Y 40/00
(Continued)

(56) References Cited

U.S. PATENT DOCUMENTS

| 2005/0100499 A1 | 5/2005 | Oya et al. |
| 2007/0053825 A1* | 3/2007 | Li .......................... D01F 11/14 423/460 |

(Continued)

FOREIGN PATENT DOCUMENTS

| CN | 105261487 A | 1/2016 |
| CN | 106935855 A | 7/2017 |

(Continued)

OTHER PUBLICATIONS

Boutopoulos et al., Polymer/carbon nanotube composite patterns via laser induced forward transfer, Applied Physics Letters, vol. 96, 041104 (2010) (Year: 2010).*

(Continued)

*Primary Examiner* — Hoa (Holly) Le
(74) *Attorney, Agent, or Firm* — Oliff PLC (57) ABSTRACT

A carbon nanotube composite is a carbon nanotube composite including one carbon nanotube and an amorphous carbon-containing layer that coats the carbon nanotube, the carbon nanotube having a D/G ratio of 0.1 or less, the D/G
(Continued)

ratio being a ratio of a peak intensity of a D band to a peak intensity of a G band in Raman spectroscopic analysis with a wavelength of 532 nm, the carbon nanotube composite being fibrous and having a diameter of 0.1 μm or more and 50 μm or less.

10 Claims, 4 Drawing Sheets

(52) U.S. Cl.
CPC ...... *C01B 2202/34* (2013.01); *C01B 2202/36* (2013.01); *C01P 2002/82* (2013.01)

(58) Field of Classification Search
USPC .......................... 977/745, 753; 427/220, 221
See application file for complete search history.

(56) References Cited

U.S. PATENT DOCUMENTS

| | | | |
|---|---|---|---|
| 2007/0224107 A1 | 9/2007 | Hikata | |
| 2008/0063586 A1 | 3/2008 | Oya et al. | |
| 2009/0169876 A1* | 7/2009 | Yamamoto | H01Q 1/32 428/337 |
| 2010/0297449 A1* | 11/2010 | Kitano | B82Y 30/00 428/408 |
| 2011/0036829 A1* | 2/2011 | Fugetsu | H05B 3/145 219/541 |
| 2019/0177166 A1 | 6/2019 | Oh et al. | |
| 2021/0309522 A1* | 10/2021 | Fujimori | C01B 32/174 |

FOREIGN PATENT DOCUMENTS

| | | |
|---|---|---|
| JP | 2003-146634 A | 5/2003 |
| JP | 2004-299986 A | 10/2004 |
| JP | 2005-330175 A | 12/2005 |
| JP | 2006-213569 A | 8/2006 |
| JP | 2014-231446 A | 12/2014 |
| WO | 2007/099975 A1 | 9/2007 |
| WO | 2018/070653 A1 | 4/2018 |

OTHER PUBLICATIONS

Pham et al., Effect of growth temperature on the synthesis of carbon nanotube arrays and amorphous carbon for thermal applications, Phys. Status Solidi A, 1600852 (2017) / DOI 10.1002/pssa.201600852 (Year: 2017).*

Kierkowicz et al., The Role of Temperature on the Degree of End-Closing and Filling of Single-Walled Carbon Nanotubes, Nanomaterials 2021, 11, 3365. https://doi.org/10.3390/nano11123365 (Year: 2021).*

* cited by examiner

FIG.6

CARBON NANOTUBE COMPOSITE, METHOD FOR MANUFACTURING THE SAME, AND METHOD FOR MANUFACTURING REFINED CARBON NANOTUBE

TECHNICAL FIELD

The present disclosure relates to a carbon nanotube composite, a method for manufacturing the same, and a method for manufacturing a refined carbon nanotube. The present application claims priority to Japanese Patent Application No. 2018-164908 filed on Sep. 3, 2018, the entire contents of which are incorporated herein by reference.

BACKGROUND ART

A carbon nanotube composed of a cylindrical sheet made of carbon atoms bonded in a hexagonal pattern is a material having excellent characteristics, such as a weight that is one fifth of that of copper, a strength that is 20 times that of steel, and a metal-like electrical conductivity. Thus, the carbon nanotube is expected, as one of nano-carbon materials, as a material contributing to decreased weight and size and significantly improved performance of electronic components and power storage devices.

The carbon nanotube is obtained, for example, by a vapor phase growth method of supplying a source gas containing carbon while heating a fine catalyst such as iron to grow carbon nanotubes from the catalyst, as described in PTL 1 (Japanese Patent Laying-Open No. 2005-330175).

CITATION LIST

Patent Literature

PTL 1: Japanese Patent Laying-Open No. 2005-330175

SUMMARY OF INVENTION

[1] A carbon nanotube composite in accordance with one aspect of the present disclosure is a carbon nanotube composite including one carbon nanotube and an amorphous carbon-containing layer that coats the carbon nanotube, the carbon nanotube having a D/G ratio of 0.1 or less, the D/G ratio being a ratio of a peak intensity of a D band to a peak intensity of a G band in Raman spectroscopic analysis with a wavelength of 532 nm, the carbon nanotube composite being fibrous and having a diameter of 0.1 μm or more and 50 μm or less.

[2] A method for manufacturing a carbon nanotube composite in accordance with one aspect of the present disclosure is a method for manufacturing a carbon nanotube composite, the method including:

a first step of preparing one carbon nanotube; and a second step of obtaining a carbon nanotube composite by coating the carbon nanotube with an amorphous carbon-containing layer.

[3] A method for manufacturing a refined carbon nanotube in accordance with one aspect of the present disclosure is a method for manufacturing a refined carbon nanotube, the method including:

a first step of preparing one carbon nanotube;

a second step of obtaining a carbon nanotube composite by coating the carbon nanotube with an amorphous carbon-containing layer; and a third step of obtaining a refined carbon nanotube by removing the amorphous carbon-containing layer from the carbon nanotube composite.

DETAILED DESCRIPTION

Problem to be Solved by the Present Disclosure

When a carbon nanotube is used as an electrode for a power storage device, for example, it is necessary to place the carbon nanotube at a predetermined position to secure electrical conductivity. However, since the carbon nanotube is extremely small with a diameter of about 0.4 nm to 20 nm, the carbon nanotube cannot be observed with an optical microscope. Thus, it has been difficult to pick up each carbon nanotube one by one with tweezers or the like and place it at a predetermined position to secure electrical conductivity. In particular, as the carbon nanotube has a higher crystallinity, the carbon nanotube tends to have a smaller diameter, resulting in an insufficient handling property. Accordingly, conventionally, electrical conductivity has been secured, not by placing each carbon nanotube one by one at a predetermined position, but by preparing a slurry containing a plurality of carbon nanotubes dispersed in an organic solvent such as toluene or dichlorobenzene or in an aqueous solution containing a surface active agent, and placing the slurry at a predetermined position.

In recent years, the need for decreased weight and size and improved performance of electrodes for power storage devices further increases, and a technique capable of placing each high crystallinity carbon nanotube one by one at a predetermined position is needed.

Accordingly, an object of the present disclosure is to provide a carbon nanotube composite that includes one high crystallinity carbon nanotube and is easily handled, a method for manufacturing the same, and a method for manufacturing a refined carbon nanotube.

Advantageous Effect of the Present Disclosure

According to the aspect described above, a carbon nanotube composite that includes one high crystallinity carbon nanotube and is easily handled, a method for manufacturing the same, and a method for manufacturing a refined carbon nanotube can be provided.

DESCRIPTION OF EMBODIMENTS OF THE PRESENT DISCLOSURE

First, aspects of the present disclosure will be described one by one.

(1) A carbon nanotube composite in accordance with one aspect of the present disclosure is a carbon nanotube composite including one carbon nanotube and an amorphous carbon-containing layer that coats the carbon nanotube, the carbon nanotube having a D/G ratio of 0.1 or less, the D/G ratio being a ratio of a peak intensity of a D band to a peak intensity of a G band in Raman spectroscopic analysis with a wavelength of 532 nm, the carbon nanotube composite being fibrous and having a diameter of 0.1 μm or more and 50 μm or less.

The carbon nanotube composite includes one high crystallinity carbon nanotube, and can have an excellent handling property.

(2) Preferably, the amorphous carbon-containing layer has a D/G ratio of 0.5 or more, the D/G ratio being a ratio of a peak intensity of a D band to a peak intensity of a G band in Raman spectroscopic analysis with a wavelength of 532 nm. Thereby, it becomes possible to remove only the amorphous carbon-containing layer by heat treatment or laser irradiation.

(3) Preferably, the carbon nanotube composite has a length of 10 μm or more. Thereby, it becomes easy to place the CNT composite at an arbitrary area by operating a manipulator while observing the CNT composite with an optical microscope.

(4) A method for manufacturing a carbon nanotube composite in accordance with one aspect of the present disclosure is a method for manufacturing a carbon nanotube composite, the method including:

a first step of preparing one carbon nanotube; and a second step of obtaining a carbon nanotube composite by coating the carbon nanotube with an amorphous carbon-containing layer.

According to the manufacturing method, it is possible to fabricate a carbon nanotube composite that includes one carbon nanotube and is easily handled.

(5) Preferably, the carbon nanotube has a D/G ratio of 0.1 or less, the D/G ratio being a ratio of a peak intensity of a D band to a peak intensity of a G band in Raman spectroscopic analysis with a wavelength of 532 nm, and the carbon nanotube composite is fibrous and has a diameter of 50 μm or less.

Thereby, the carbon nanotube composite can include a high crystallinity carbon nanotube, and has an improved handling property.

(6) Preferably, the second step includes heat-treating the carbon nanotube at a temperature of 950° C. or more and 1100° C. or less in a hydrocarbon-based gas. Thereby, it is possible to form the amorphous carbon-containing layer having a predetermined D/G ratio on the surface of the carbon nanotube while maintaining the crystallinity of the carbon nanotube.

(7) A method for manufacturing a refined carbon nanotube in accordance with one aspect of the present disclosure is a method for manufacturing a refined carbon nanotube, the method including:

a first step of preparing one carbon nanotube;

a second step of obtaining a carbon nanotube composite by coating the carbon nanotube with an amorphous carbon-containing layer; and a third step of obtaining a refined carbon nanotube by removing the amorphous carbon-containing layer from the carbon nanotube composite.

Thereby, it is possible to fabricate a carbon nanotube composite that is easily handled, and to place one refined carbon nanotube at a desired location by placing the carbon nanotube composite at the desired position and then performing the third step.

(8) Preferably, the carbon nanotube and the refined carbon nanotube each have a D/G ratio of 0.1 or less, the D/G ratio being a ratio of a peak intensity of a D band to a peak intensity of a G band in Raman spectroscopic analysis with a wavelength of 532 nm, and the carbon nanotube composite is fibrous and has a diameter of 0.1 μm or more and 50 μm or less.

Thereby, the carbon nanotube composite can include a high crystallinity carbon nanotube, and has an improved handling property. Further, a high crystallinity refined carbon nanotube can be obtained.

(9) When the D/G ratio of the carbon nanotube has a value of R1 and the D/G ratio of the refined carbon nanotube has a value of R2, the R1 and the R2 preferably simultaneously exhibit a relation indicated by the following expression 1.

$$-0.2 \leq R2 - R1 \leq 0.2 \quad \text{expression 1}$$

Here, in the above expression 1, the R1 satisfies $0 \leq R1 \leq 0.1$ and the R2 satisfies $0 \leq R2 \leq 0.1$.

Thereby, a high crystallinity refined carbon nanotube can be obtained.

(10) Preferably, the second step includes heat-treating the carbon nanotube at a temperature of 950° C. or more and 1100° C. or less in a hydrocarbon-based gas. Thereby, it is possible to form the amorphous carbon-containing layer having a predetermined D/G ratio on the surface of the carbon nanotube while maintaining the crystallinity of the carbon nanotube.

(11) Preferably, the third step includes heat-treating the carbon nanotube composite at a temperature of 400° C. or more and 800° C. or less under oxidizing conditions. Thereby, it is possible to remove only the amorphous carbon-containing layer from the carbon nanotube composite while maintaining the crystallinity of the carbon nanotube.

(12) Preferably, the third step includes heat-treating the carbon nanotube composite at a temperature of 560° C. or more and 690° C. or less under the oxidizing conditions. Thereby, it is possible to remove only the amorphous carbon-containing layer from the carbon nanotube composite while maintaining the crystallinity of the carbon nanotube.

(13) Preferably, the third step includes irradiating the carbon nanotube composite with a laser beam. Thereby, it is possible to remove only the amorphous carbon-containing layer from the carbon nanotube composite while maintaining the crystallinity of the carbon nanotube.

Details of Embodiments of the Present Disclosure

Specific examples of a carbon nanotube composite, a method for manufacturing the same, and a method for manufacturing a refined carbon nanotube in accordance with one embodiment of the present disclosure will be described below with reference to the drawings.

In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

First Embodiment: Carbon Nanotube Composite (Carbon Nanotube Composite)

Figure 1:
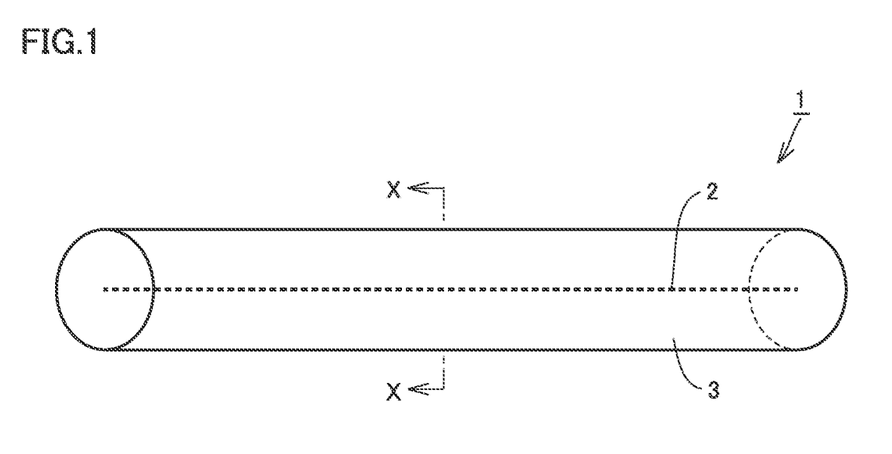
FIG. 1 is a view illustrating a typical exemplary configuration of a carbon nanotube composite in accordance with one embodiment of the present disclosure.
Figure 2:
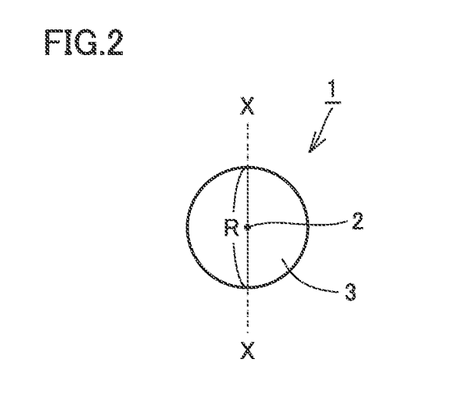
FIG. 2 is a cross sectional view of the carbon nanotube composite of FIG. 1 taken along a line X-X.

As shown in FIGS. 1 and 2, a carbon nanotube composite (hereinafter also referred to as a CNT composite) 1 in accordance with the present embodiment includes one carbon nanotube (hereinafter also referred to as a CNT) 2 and an amorphous carbon-containing layer 3 that coats the carbon nanotube. The carbon nanotube has a D/G ratio of 0.1 or less, the D/G ratio being a ratio of a peak intensity of a D band to a peak intensity of a G band in Raman spectroscopic analysis with a wavelength of 532 nm. The carbon nanotube composite is fibrous and has a diameter R of 0.1 μm or more and 50 μm or less. With these features, the carbon nanotube composite in accordance with the present embodiment can have effects indicated in (1) to (3) described below.

(1) Since the carbon nanotube composite in accordance with the present embodiment is fibrous and has a diameter of 0.1 μm or more and 50 μm or less, it can be observed with an optical microscope. Accordingly, it is possible to pick up each carbon nanotube composite in accordance with the present embodiment one by one with tweezers or the like and place it at a predetermined position under observation with the optical microscope, and thus the carbon nanotube composite is easily handled. That is, the carbon nanotube composite in accordance with the present embodiment can have an excellent handling property.

(2) The amorphous carbon-containing layer included in the carbon nanotube composite in accordance with the present embodiment can be removed by performing heat treatment or laser irradiation, and thereby, a refined carbon nanotube only can be obtained. Thus, it is possible to place one refined carbon nanotube only at a desired position, by placing the CNT composite at the desired position and then performing heat treatment or laser irradiation to remove the amorphous carbon-containing layer. That is, it is possible to place one refined carbon nanotube at a desired position, by using the carbon nanotube composite in accordance with the present embodiment.

(3) The carbon nanotube included in the carbon nanotube composite in accordance with the present embodiment has a D/G ratio of 0.1 or less, the D/G ratio being the ratio of the peak intensity of the D band to the peak intensity of the G band in the Raman spectroscopic analysis with a wavelength of 532 nm, and has a high crystallinity. Thus, the carbon nanotube can have a high tensile strength and a high electrical conductivity.

The carbon nanotube composite has the shape of one fiber. The overall external appearance of the carbon nanotube composite can be a linear shape, or a curved shape such as a U shape.

The length of the carbon nanotube composite can be adjusted as appropriate depending on the purpose. The length of the CNT composite is preferably 10 μm or more, and further preferably 100 μm or more, for example. When the length of the CNT composite is 10 μm or more, it becomes easy to place the CNT composite at an arbitrary area by operating a manipulator while observing the CNT composite with the optical microscope, which is suitable from the viewpoint of fabricating a minute electric machine system (MEMS), for example. The length of the CNT composite is particularly preferably 100 μm or more. Although the upper limit value of the length of the CNT composite is not particularly limited, it is preferably 600 mm or less from the viewpoint of manufacturing. The length of the CNT composite can be measured by observation with the optical microscope. When the CNT composite has a curved shape rather than a linear shape, the length along a curve is measured.

The carbon nanotube composite has a diameter of 0.1 μm or more and 50 μm or less. Thereby, the CNT composite can be observed with the optical microscope, and is easily handled. The diameter of the CNT composite is preferably 0.1 μm or more and 5 μm or less, and further preferably 0.5 μm or more and 3 μm or less.

In the present specification, the diameter of the carbon nanotube composite means an average outer diameter of one CNT composite. The average outer diameter of the one CNT composite is obtained by observing cross sections at two arbitrary positions of the one CNT composite with the optical microscope, measuring, in each cross section, an outer diameter, which is the distance between farthest two points on the outer circumference of the CNT composite, and calculating an average value of the obtained outer diameters.

(Carbon Nanotube)

The structure of the carbon nanotube is not limited as long as the carbon nanotube has a D/G ratio of 0.1 or less, the D/G ratio being the ratio of the peak intensity of the D band to the peak intensity of the G band in the Raman spectroscopic analysis with a wavelength of 532 nm. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, a cup stack-type nanotube having a structure in which graphenes in the shape of a bottomless paper cup are stacked, and the like.

The shape of the carbon nanotube is not particularly limited, and both a carbon nanotube having closed ends and a carbon nanotube having opened ends can be used. A catalyst used during fabrication of the carbon nanotube may adhere to one end or both ends of the carbon nanotube. In addition, a cone portion made of a conical graphene may be formed at one end or both ends of the carbon nanotube.

The length of the carbon nanotube can be selected as appropriate depending on the purpose. The length of the carbon nanotube is preferably 10 μm or more, and further preferably 100 μm or more, for example. When the length of the carbon nanotube is 10 μm or more, a CNT composite having a length of 10 μm or more can be obtained. The length of the CNT is particularly preferably 100 μm or more. Although the upper limit value of the length of the carbon nanotube is not particularly limited, it is preferably 600 mm or less from the viewpoint of manufacturing. The length of the CNT can be measured by observation with a scanning electron microscope.

The diameter of the carbon nanotube is preferably 0.6 nm or more and 20 nm or less, and further preferably 1 nm or more and 10 nm or less. In particular, when the diameter of the carbon nanotube is 1 nm or more and 10 nm or less, such a diameter is suitable from the viewpoint of heat resistance under oxidizing conditions.

In the present specification, the diameter of the carbon nanotube means an average outer diameter of one CNT. The average outer diameter of the one CNT can be calculated by directly observing a projection image of the CNT with a transmission electron microscope and performing measurement. Alternatively, the average outer diameter of the one CNT can be obtained by measuring a Raman shift value in a radial breathing mode specific to the CNT using Raman spectroscopy, and performing a calculation from a relational expression of the diameter of the CNT and the Raman shift value. When the CNT includes a cone portion at one end or both ends thereof, measurement is performed at the location other than the cone portion.

The carbon nanotube has a D/G ratio of 0.1 or less, the D/G ratio being the ratio of the peak intensity of the D band to the peak intensity of the G band in the Raman spectroscopic analysis with a wavelength of 532 nm. The D/G ratio will be described using a Raman spectrum of the carbon nanotube obtained by the Raman spectroscopic analysis.

The G band is a peak originating in the CNT seen in the vicinity of a Raman shift of 1590 cm$^{-1}$ in the Raman spectrum obtained by the Raman spectroscopic analysis method. The D band is a peak originating in amorphous carbon or a defect in graphite or the CNT seen in the vicinity of a Raman shift of 1350 cm$^{-1}$ in the Raman spectrum obtained by the Raman spectroscopic analysis method. Therefore, as the D/G ratio has a smaller value, the carbon nanotube has a higher crystallinity, and the carbon nanotube contains a smaller amount of amorphous carbon or defective graphite.

The CNT included in the CNT composite in accordance with the present embodiment has a D/G ratio of 0.1 or less, contains less amorphous carbon or defective graphite, and has a high crystallinity. Thus, the CNT can have a high tensile strength and a high electrical conductivity. If the D/G ratio of the CNT exceeds 0.1, the CNT may be unable to have a sufficient tensile strength and a high electrical conductivity. Further, if the D/G ratio of the CNT exceeds 0.1, the CNT itself may deteriorate when the amorphous carbon-containing layer is removed from the CNT composite in a method for manufacturing a refined carbon nanotube in a third embodiment described later. The D/G ratio is preferably 0.1 or less, and more preferably 0.01 or less. Although the lower limit value of the D/G ratio is not particularly limited, it can be 0 or more, for example.

In the present specification, the D/G ratio of the carbon nanotube in the carbon nanotube composite is a value measured by the following method.

First, one carbon nanotube composite is heat-treated at a temperature of 600° C. for 10 minutes in the atmosphere. Thereby, the amorphous carbon-containing layer is removed from the carbon nanotube composite, and thereby one refined carbon nanotube is obtained. Raman spectroscopic analysis is performed on the refined carbon nanotube under the following conditions to obtain a Raman spectrum (hereinafter also referred to as a refined CNT Raman spectrum) (see FIG. 4). A D/G ratio is calculated from a peak intensity of a D band and a peak intensity of a G band in the refined CNT Raman spectrum. The D/G ratio of the refined CNT is regarded as the D/G ratio of the carbon nanotube in the carbon nanotube composite.

(Measurement Conditions for Raman Spectroscopic Analysis)
Wavelength: 532 nm
Laser power: 17 mW
Exposure time: one second
Average number of times: three times
Objective lens magnification: 50 times.

The reason for regarding that the D/G ratio of the CNT in the CNT composite in accordance with the present embodiment is the same as the D/G ratio of the refined CNT is as follows.

Figure 3:
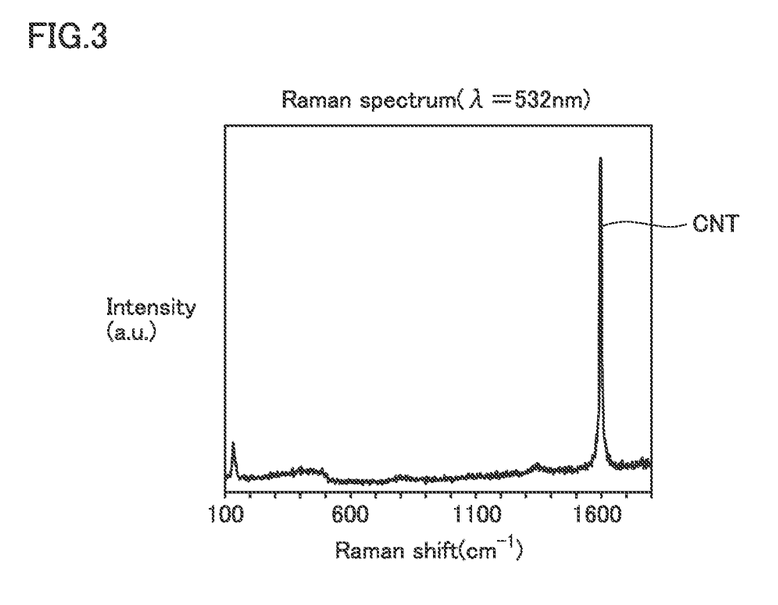
FIG. 3 is a view showing a Raman spectrum of a carbon nanotube used in one embodiment of the present disclosure.

The present inventors performed Raman spectroscopic analysis on one carbon nanotube before being coated with an amorphous carbon-containing layer under the same conditions as those described above, to obtain a Raman spectrum (hereinafter also referred to as a CNT Raman spectrum) (see FIG. 3). A D/G ratio was calculated from a peak intensity of a D band and a peak intensity of a G band in the CNT Raman spectrum.

Then, the carbon nanotube was coated with the amorphous carbon-containing layer to prepare one CNT composite. The CNT composite was heat-treated at a temperature of 650° C. for 60 minutes under oxidizing conditions, and thereby the amorphous carbon-containing layer was removed from the CNT composite to obtain one refined carbon nanotube. Raman spectroscopic analysis was performed on the refined CNT under the above conditions to obtain a Raman spectrum (hereinafter also referred to as a refined CNT Raman spectrum) (see FIG. 4). A D/G ratio was calculated from a peak intensity of a D band and a peak intensity of a G band in the refined CNT Raman spectrum.

It was confirmed that, in the CNT composite of the present embodiment, the D/G ratio of the one carbon nanotube before being coated with the amorphous carbon-containing layer is substantially the same as the value of the D/G ratio of the one refined carbon nanotube obtained by removing the amorphous carbon-containing layer from the CNT composite. This indicates that the D/G ratio of the carbon nanotube before being coated with the amorphous carbon-containing layer is maintained in the CNT in the CNT composite and the refined CNT. Therefore, in the present specification, the D/G ratio of the carbon nanotube in the CNT composite can be regarded as the same as the D/G ratio of the refined CNT.

Figure 4:
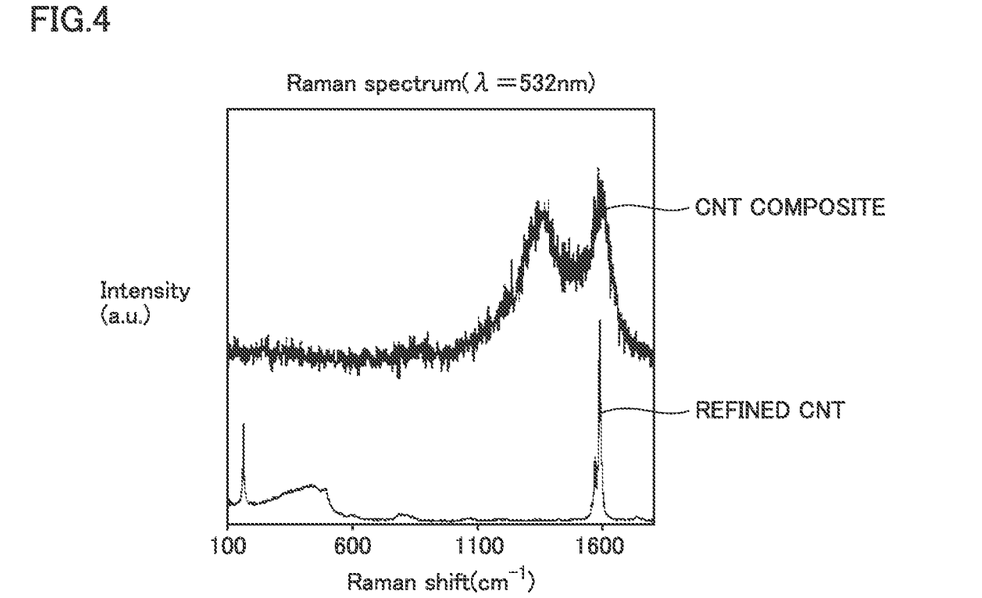
FIG. 4 is a view showing Raman spectra of the carbon nanotube composite and a refined carbon nanotube in accordance with one embodiment of the present disclosure.

It should be noted that, when Raman spectroscopic analysis (wavelength: 532 nm) is performed on the carbon nanotube composite to obtain a Raman spectrum (hereinafter also referred to as a CNT composite Raman spectrum), a peak of a D band is clearly confirmed, as shown in FIG. 4. The D band is considered to originate in the amorphous carbon-containing layer included in the CNT composite.

The method for manufacturing the carbon nanotube is not particularly limited as long as it is a method capable of obtaining a carbon nanotube satisfying the D/G ratio described above. Examples of such a method include a thermal decomposition method of thermally decomposing a source gas such as an alcohol-based or a hydrocarbon-based source gas within a heating furnace using catalyst particles having a nanometer level diameter, to grow carbon crystals on the catalyst particles and obtain carbon nanotubes. Examples of the thermal decomposition method include a method of causing catalyst particles to be carried on a base material by coating or the like to grow CNTs on the catalyst particles, a method of causing a catalyst to be suspended in a vapor phase to grow CNTs on the catalyst, and a method of separating a plurality of catalyst particles in a close contact state in a flow of a source gas to grow CNTs between the plurality of catalyst particles.

(Amorphous Carbon-Containing Layer)
The amorphous carbon-containing layer is a layer (region) containing amorphous carbon. Amorphous carbon is not particularly limited, and conventionally known amorphous carbon can be used. Examples of amorphous carbon that can be used include ta-C (tetrahedral amorphous carbon), a-C (amorphous carbon), ta-C:H (tetrahedral amorphous carbon hydride), and a-C: H (amorphous carbon hydride). Especially, it is preferable to use a-C because the amorphous carbon-containing layer can be formed by a simple technique. Amorphous carbon having a ratio of SP3/SP2 of 0.2 or more and 0.8 or less can be used, for example.

The amorphous carbon-containing layer preferably has a D/G ratio of 0.5 or more, the D/G ratio being a ratio of a peak intensity of a D band to a peak intensity of a G band in Raman spectroscopic analysis with a wavelength of 532 nm. Thereby, only the amorphous carbon-containing layer can be removed by heat treatment or laser irradiation. The D/G ratio of the amorphous carbon-containing layer is more preferably 0.7 or more, and further preferably 1.0 or more. Although the upper limit value of the D/G ratio of the amorphous carbon-containing layer is not particularly limited, it is preferably 2.0 or less, for example. Here, the D/G ratio of the amorphous carbon-containing layer can be regarded as the same as the D/G ratio of the carbon nanotube composite. This is because the volume ratio of the CNT in the CNT composite is $10^{-7}$ volume % or less, which is extremely small, and thus it is considered that the influence of the D/G ratio of the CNT on the D/G ratio of the CNT composite is negligible.

Since the conditions for the Raman spectroscopic analysis performed to calculate the D/G ratio of the amorphous carbon-containing layer are the same as the conditions for the Raman spectroscopic analysis performed to calculate the D/G ratio of the carbon nanotube described above, the description thereof will not be repeated.

The content of amorphous carbon in the amorphous carbon-containing layer is preferably 1 volume % or more, more preferably 10 volume % or more, and further preferably 50 volume % or more. Although the upper limit value of the content of amorphous carbon in the amorphous carbon-containing layer is not particularly limited, it can be 100 volume %, for example. The content of amorphous carbon in the amorphous carbon-containing layer can be measured by a thermogravimetric analysis method.

The amorphous carbon-containing layer may be made of amorphous carbon only, or may contain graphite microcrystals, tar, and an organic compound produced by thermal decomposition, in addition to amorphous carbon. These substances contained in the amorphous carbon-containing layer are produced by thermal decomposition of methane gas or the like which is a carbon source material, and a subsequent cooling process.

Graphite microcrystals mean crystal particles made of graphite having a volume average particle diameter of 1 nm or more and 50 nm or less. In the present specification, the "volume average particle diameter" means a median diameter (d50) in volume-based particle size distribution (volume distribution), and means an average particle diameter of all graphite microcrystals contained in the amorphous carbon-containing layer. It should be noted that, in the present specification, the "volume average particle diameter" may simply be referred to as a "particle diameter".

The particle diameter of each graphite microcrystal for calculating the particle diameter (volume average particle diameter) of graphite microcrystals can be measured by the following method. First, a reflected electron image of the amorphous carbon-containing layer at an arbitrary region in an arbitrary cross section of the CNT composite is observed with an electron microscope at a magnification of 5000 times. Then, in the reflected electron image, a diameter of a circle circumscribed about a particle constituting each graphite microcrystal (that is, a circumscribed circle equivalent diameter) is measured, and the diameter is determined as a particle diameter of the graphite microcrystal.

Based on the particle diameters of graphite microcrystals obtained above, the volume average particle diameter is calculated.

The content of graphite microcrystals in the amorphous carbon-containing layer is preferably 99 volume % or less, more preferably 90 volume % or less, and further preferably 50 volume % or less. Although the lower limit value of the content of graphite microcrystals in the amorphous carbon-containing layer is not particularly limited, it can be 1 volume %, for example. The content of graphite microcrystals in the amorphous carbon-containing layer can be measured by observation with a transmission electron microscope or a thermogravimetric analysis method.

The thickness of the amorphous carbon-containing layer is preferably 0.05 µm or more and 25 µm or less. Here, the thickness of the amorphous carbon-containing layer means an average value of shortest distances each extending from one arbitrary point on the outer circumference of the CNT to one arbitrary point on the outer circumference of the CNT composite in a cross section of the CNT composite. Thus, since the carbon nanotube composite has a sufficient diameter, the CNT composite is easily handled. The thickness of the amorphous carbon-containing layer is more preferably 0.05 µm or more and 2.5 µm or less, and further preferably 0.25 µm or more and 1.5 µm or less. The thickness of the amorphous carbon-containing layer is obtained by observing cross sections of the CNT composite at two arbitrary positions with the electron microscope to measure thicknesses of the amorphous carbon-containing layer, and calculating an average value of the obtained thicknesses.

Second Embodiment: Method for Manufacturing Carbon Nanotube Composite

A method for manufacturing a carbon nanotube composite in accordance with the present embodiment includes a first step of preparing one carbon nanotube, and a second step of obtaining a carbon nanotube composite by coating the carbon nanotube with an amorphous carbon-containing layer.

(First Step)

In the first step, one carbon nanotube is prepared. The carbon nanotube can be the same as the carbon nanotube described in the first embodiment.

The method for preparing the carbon nanotube is not particularly limited, and a commercially available carbon nanotube may be used, or a carbon nanotube fabricated by a conventionally known method can be used. Especially, it is preferable to prepare a carbon nanotube fabricated by a method of separating a plurality of catalyst particles in a close contact state in a flow of a source gas to grow CNTs between the plurality of catalyst particles (hereinafter also referred to as a floating bridge (FB) method), because a carbon nanotube having a high crystallinity and composed of only six-membered rings is obtained.

Figure 5:
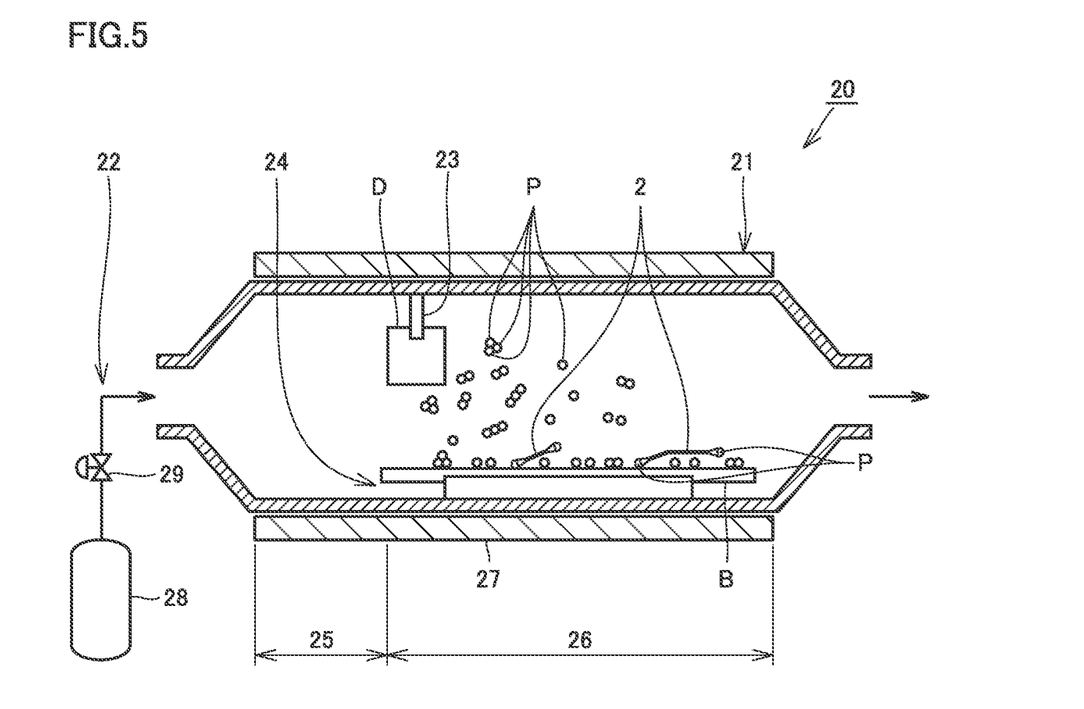
FIG. 5 is a view showing an example of a carbon nanotube manufacturing apparatus.

The FB method can be performed, for example, using a carbon nanotube manufacturing apparatus 20 shown in FIG. 5. Carbon nanotube manufacturing apparatus 20 includes a tubular reaction chamber 21, a gas supplying mechanism 22 for supplying a carbon-containing gas into reaction chamber 21 from one end of reaction chamber 21, a catalyst supplying mechanism 23 for releasing a plurality of catalyst particles P in a contact state into the carbon-containing gas flowing through reaction chamber 21, and a substrate holding mechanism 24 placed within reaction chamber 21 for holding a substrate B that captures catalyst particles P.

<Reaction Chamber>

Reaction chamber 21 laminarizes the flow of the carbon-containing gas in an entrance zone 25 upstream of catalyst supplying mechanism 23, and uses the laminarized carbon-containing gas to form carbon nanotubes in a formation zone 26 downstream of catalyst supplying mechanism 23.

Reaction chamber 21 is provided with a heater 27. That is, reaction chamber 21 is heated by heater 27.

The internal temperature in formation zone 26 of reaction chamber 21 is preferably 800° C. or more and 1200° C. or less. In order to maintain such a temperature, the carbon-containing gas may be heated and then supplied from gas supplying mechanism 22 into reaction chamber 21, or the carbon-containing gas may be heated in entrance zone 25.

<Gas Supplying Mechanism>

Gas supplying mechanism 22 can have a gas cylinder 28 and a flow control valve 29 to supply the carbon-containing gas into reaction chamber 21.

As the carbon-containing gas supplied from gas supplying mechanism 22, a reductive gas such as hydrocarbon gas is used. As such a carbon-containing gas, a mixed gas of acetylene and nitrogen or argon, methane, or the like can be used, for example.

The lower limit of the average flow rate of the carbon-containing gas supplied from gas supplying mechanism 22 within the reaction chamber is 0.05 cm/sec, preferably 0.10 cm/sec, and more preferably 0.20 cm/sec. On the other hand, the upper limit of the average flow rate of the carbon-containing gas within reaction chamber 21 is preferably 10.0 cm/sec, and more preferably 0.5 cm/sec. If the average flow rate of the carbon-containing gas within reaction chamber 21 is less than the lower limit, the wind pressure may be insufficient to elongate the carbon nanotubes formed between catalyst particles P. On the contrary, if the average flow rate of the carbon-containing gas within reaction chamber 21 exceeds the upper limit, the carbon nanotubes may be detached from catalyst particles P, which may stop the growth of the carbon nanotubes and consequently inhibit the formation of the carbon nanotubes.

The lower limit of the Reynolds number of the flow of the carbon-containing gas supplied from gas supplying mechanism 22 within reaction chamber 21 is preferably 0.01, and more preferably 0.05. On the other hand, the upper limit of the Reynolds number described above is 1000, preferably 100, and more preferably 10. If the Reynolds number is less than the lower limit, design is excessively restricted, which may make carbon nanotube manufacturing apparatus 20 unnecessarily expensive and may make the manufacturing efficiency of the carbon nanotubes unnecessarily low. If the Reynolds number exceeds the upper limit, the flow of the carbon-containing gas may be disturbed, which may inhibit production of the carbon nanotubes and elongation of the carbon nanotubes between catalyst particles P.

Preferably, gas supplying mechanism 22 can repeatedly change the amount of the carbon-containing gas to be supplied to reaction chamber 21. Thereby, the flow rate of the carbon-containing gas in reaction chamber 21 increases or decreases, which promotes separation of the plurality of combined catalyst particles, whereby increases the number of carbon nanotubes to be obtained.

<Catalyst Supplying Mechanism>

Catalyst supplying mechanism 23 can be a mechanism for holding, in the flow of the carbon-containing gas, a disintegrable catalyst D which disintegrates and is divided into the plurality of catalyst particles P when subjected to the wind pressure of the carbon-containing gas. Catalyst supplying mechanism 23 may be a mechanism for holding a long-sized disintegrable catalyst D having a band shape or a rod shape, for example, and gradually feeding disintegrable catalyst D into reaction chamber 21. By using disintegrable catalyst D in this manner, it is possible to form the plurality of catalyst particles P at a high temperature and in the contact state in the flow of the carbon-containing gas, which makes it possible to reliably grow the carbon nanotubes between the plurality of catalyst particles.

As disintegrable catalyst D, metal foil which is easy to form fine catalyst particles P is suitably used. Examples of the material for disintegrable catalyst D can include iron, nickel, and the like, and especially, high-purity iron excellent in disintegration property and catalysis is particularly preferable. It is considered that, when the high-purity iron is heated to a high temperature and is exposed to the carbon-containing gas within reaction chamber 21, iron carbide ($Fe_3C$) is formed on the surface thereof due to carburization, and thereby the high-purity iron easily disintegrates from the surface and can release catalyst fine particles P sequentially. In this case, the main ingredient of formed catalyst particles P is iron carbide or iron oxide ($Fe_2O_3$).

The lower limit of the average diameter of catalyst particles P to be finally captured by substrate B is preferably 30 nm, more preferably 40 nm, and further preferably 50 nm. On the other hand, the upper limit of the average diameter of catalyst particles P to be captured by substrate B is preferably 1000 more preferably 100 and further preferably 10 If the average diameter of catalyst particles P to be captured by substrate B is less than the lower limit, the carbon nanotubes formed from the catalyst particles have a small diameter and a low elongation ratio, which may make it impossible to sufficiently elongate the carbon nanotubes. On the contrary, if the average diameter of the catalyst particles to be captured by the substrate exceeds the upper limit, it may be difficult to elongate the carbon nanotubes formed from the catalyst particles.

The lower limit of the average thickness of the metal foil used as disintegrable catalyst D is preferably 1 μm, and more preferably 2 μm. On the other hand, the upper limit of the average thickness of the metal foil used as disintegrable catalyst D is preferably 500 μm, and more preferably 200 μm. If the average thickness of the metal foil used as disintegrable catalyst D is less than the lower limit, the metal foil may be broken and blown by the carbon-containing gas. On the contrary, if the average thickness of the metal foil used as disintegrable catalyst D exceeds the upper limit, the disintegration rate may be decreased, which may lower the formation efficiency of the carbon nanotubes.

<Substrate Holding Mechanism>

Substrate holding mechanism 24 holds substrate B below a catalyst supplying position of catalyst supplying mechanism 23 such that substrate B extends downstream along the flow direction of the carbon-containing gas. Preferably, substrate B is held to extend widely in a range where catalyst particles P may fall thereon, in consideration of the falling speed of catalyst particles P in the flow of the carbon-containing gas.

Substrate holding mechanism 24 allows substrate B to capture catalyst particles P released from catalyst supplying mechanism 23 and hold catalyst particles P at captured positions against the flow of the carbon-containing gas. Thereby, due to the wind pressure of the carbon-containing gas applied to a carbon nanotube that extends from a catalyst particle P held on substrate B and to another catalyst particle P at the other end of the carbon nanotube, the carbon nanotube that extends from catalyst particle P held on substrate B is pulled and plastically deformed, and is elongated in a longitudinal direction with the diameter thereof being decreased.

Figure 6:
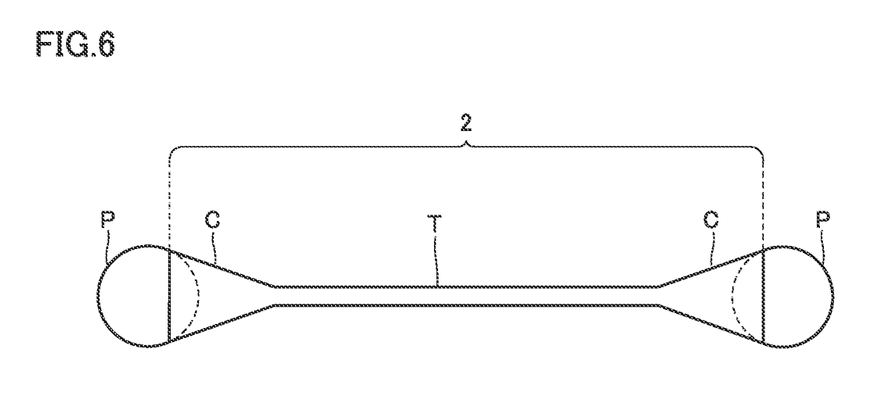
FIG. 6 is a view showing an example of the carbon nanotube used in one embodiment of the present disclosure.

Even during such elongation of the carbon nanotube, the carbon nanotube with the original diameter grows on catalyst particle P. Thus, the carbon nanotube fabricated by the FB method using carbon nanotube manufacturing apparatus 20 can include a tubular tube portion T and conical cone portions C which expand continuously in diameter from ends of the tube portion, as shown in FIG. 6.

That is, carbon nanotube manufacturing apparatus 20 elongates the carbon nanotube formed by the vapor phase growth method, simultaneously with the formation thereof, using the wind pressure of the carbon-containing gas, and thereby converts some hexagonal cells of the carbon nanotube into pentagonal cells to form the conical cone portion, and converts the pentagonal cells again into hexagonal cells to form the tube portion which is a carbon nanotube with a smaller diameter.

Since carbon nanotube manufacturing apparatus 20 elongates the carbon nanotube that grows on catalyst particle P, it can form the tube portion at an extremely high speed as compared with the growth speed of the carbon nanotube on catalyst particle P, which makes it possible to form a long carbon nanotube in a relatively short time. Thus, a sufficiently long carbon nanotube can be formed even if the time for which the conditions for allowing the carbon nanotube to continuously grow on catalyst particle P can be maintained is short.

It is considered that carbon nanotube manufacturing apparatus 20 promotes incorporation of carbon atoms at the growth point of the carbon nanotube by applying a tension to the carbon nanotube on catalyst particle P using the wind pressure of the carbon-containing gas. Thereby, it is considered that carbon nanotube manufacturing apparatus 20 can further increase the growth rate of the carbon nanotube, and thus the increase rate of the length of the obtained carbon nanotube.

It is considered that, in carbon nanotube manufacturing apparatus 20, by applying a tension to the carbon nanotube on catalyst particle P using the wind pressure of the carbon-containing gas, the carbon nanotube is less likely to be curved, and thus a linear carbon nanotube including tube portion T composed of only six-membered rings of carbon can be obtained. The carbon nanotube composed of only six-membered rings of carbon is less likely to be deteriorated even when it is exposed to a high temperature oxidative gas (atmosphere) in a third step of the third embodiment described later, and thus can maintain quality.

On the other hand, if the carbon nanotube contains five-membered rings or seven-membered rings of carbon in addition to the six-membered rings of carbon, a curve originating in the five-membered rings or seven-membered rings is likely to be produced. When the carbon nanotube containing the curve is exposed to the high temperature oxidative gas (atmosphere) in the third step of the third embodiment described later, a hole is formed in this curve portion because the reaction proceeds faster, and this curve portion is deteriorated because a dangling bond is formed, causing quality deterioration. In the carbon nanotube with such a deteriorated quality, a strong D band peak is confirmed in Raman spectroscopic analysis.

As substrate B, a silicon substrate, a heat-resistant glass substrate made of such as quartz glass, a ceramic substrate made of such as alumina, or the like can be used, for example. Further, substrate holding mechanism 24 may move a long-sized substrate or a plurality of substrates along the flow direction of the carbon-containing gas. By moving substrate B in this manner, the carbon nanotube manufacturing apparatus can prevent the surface of substrate B from being filled up with catalyst particles P, and continuously manufacture the carbon nanotubes.

(Second Step)

In the second step, a carbon nanotube composite is obtained by coating the carbon nanotube prepared in the first step with an amorphous carbon-containing layer.

In conventional methods for manufacturing a carbon nanotube, by-products such as amorphous carbon and graphite microcrystals may be formed simultaneously with the production of the carbon nanotube. Since such by-products affect the electrical conductivity and mechanical characteristics of the carbon nanotube itself, the original characteristics of the carbon nanotube such as electrical conductivity and mechanical characteristics are deteriorated. Accordingly, for conventional carbon nanotubes, techniques of removing by-products such as amorphous carbon and graphite microcrystals have been studied to increase the crystallinity of the carbon nanotubes.

There have also been studied methods for manufacturing a carbon nanotube capable of obtaining a high crystallinity carbon nanotube without forming by-products such as amorphous carbon during the production of the carbon nanotube. However, since the high crystallinity carbon nanotube is extremely small with a diameter of about 0.8 nm to 10 nm, the carbon nanotube cannot be observed with an optical microscope. Thus, it has been difficult to handle the carbon nanotube.

As a result of earnest studies on a method for facilitating handling of a high crystallinity carbon nanotube, the present inventors have newly found that, by coating the carbon nanotube with an amorphous carbon-containing layer to have an increased diameter, the carbon nanotube can be observed with an optical microscope and is easily handled. Means of forming a carbon nanotube composite by coating a high crystallinity carbon nanotube with an amorphous carbon-containing layer is based on a technical idea completely opposite to a conventional technical idea of removing by-products such as amorphous carbon and graphite microcrystals contained in a carbon nanotube.

Examples of the method for coating the carbon nanotube with the amorphous carbon-containing layer include heat-treating the carbon nanotube at a temperature of 950° C. or more and 1100° C. or less in a hydrocarbon-based gas. Here, examples of the hydrocarbon-based gas that can be used include methane gas, ethylene gas, acetylene gas, ethanol gas, and benzene gas. The temperature of the heat treatment is preferably 950° C. or more and 1050° C. or less. The duration time of the heat treatment is changed as appropriate depending on the temperature of the heat treatment and the target thickness of the amorphous carbon-containing layer. The duration time of the heat treatment is preferably 1 minute or more and 60 minutes or less, and further preferably 5 minutes or more and 30 minutes or less, for example.

The total concentration of the methane gas, the ethylene gas, the acetylene gas, the ethanol gas, and the benzene gas in the hydrocarbon-based gas is preferably 1 volume % or more, more preferably 70 volume % or more, and further preferably 100 volume % or more. If the total concentration is less than 1 volume %, the formation speed of the amorphous carbon-containing layer may become slow. On the other hand, the upper limit of the total concentration is not particularly limited, and is preferably 100 volume % from the viewpoint of improving the formation speed of the amorphous carbon-containing layer. Besides the methane gas, the ethylene gas, the acetylene gas, the ethanol gas, and the benzene gas, the hydrocarbon-base gas may include an inert gas such as helium gas, argon gas, or nitrogen gas which does not promote oxidation of the amorphous carbon-containing layer, and/or a reductive gas such as hydrogen gas.

The average flow rate of the hydrocarbon-based gas within the reaction chamber is preferably 0.05 cm/sec or more, more preferably 0.10 cm/sec or more, and further preferably 0.20 cm/sec or more. If the average flow rate of the hydrocarbon-based gas is less than 0.05 cm/sec, the formation speed of the amorphous carbon-containing layer may be significantly decreased. On the other hand, the upper limit of the average flow rate of the hydrocarbon-based gas within the reaction chamber is preferably 10.0 cm/sec or less, more preferably 1 cm/sec or less, and further preferably 0.50 cm/sec or less. If the average flow rate of the hydrocarbon-based gas exceeds 10.0 cm/sec, the hydrocarbon-based gas may pass through the reaction chamber before reaching the thermal decomposition temperature of the hydrocarbon-based gas, and the amorphous carbon-containing layer may not be formed.

The carbon nanotube composite obtained in the second step has a large diameter, can be observed with an optical microscope, and is easily handled. Therefore, each carbon nanotube composite can be placed one by one at a desired position according to the purpose of the carbon nanotube.

Third Embodiment: Method for Manufacturing Refined Carbon Nanotube

A method for manufacturing a refined carbon nanotube in accordance with the present embodiment includes a first step of preparing one carbon nanotube, a second step of obtaining a carbon nanotube composite by coating the carbon nanotube with an amorphous carbon-containing layer, and a third step of obtaining a refined carbon nanotube by removing the amorphous carbon-containing layer from the carbon nanotube composite.

(First Step and Second Step)
The first step and the second step can be the same as the steps described in the second embodiment.

(Third Step)
In the third step, a refined carbon nanotube is obtained by removing the amorphous carbon-containing layer from the carbon nanotube composite obtained in the second step.

Since the carbon nanotube composite obtained in the second step is easily handled, each carbon nanotube composite can be placed one by one at a desired position. Therefore, by placing one carbon nanotube composite at a desired position and then performing the third step to remove the amorphous carbon-containing layer, one refined carbon nanotube only can be placed at the desired position.

As a result of earnest studies on a method for removing the amorphous carbon-containing layer from the carbon nanotube composite, the present inventors have found that, by heat-treating the carbon nanotube composite under predetermined conditions or irradiating the CNT composite with a laser beam, only the amorphous carbon-containing layer can be removed from the carbon nanotube composite while maintaining the crystallinity of the carbon nanotube, and thus a high crystallinity refined carbon nanotube can be obtained.

When the amorphous carbon-containing layer is removed from the carbon nanotube composite by heat treatment, the carbon nanotube composite is heat-treated at a temperature of 400° C. or more and 800° C. or less under oxidizing conditions, for example. Thereby, only the amorphous carbon-containing layer can be removed from the carbon nanotube composite while maintaining the crystallinity of the carbon nanotube.

If the temperature of the heat treatment is less than 400° C., it is not possible to sufficiently remove the amorphous carbon-containing layer. On the other hand, if the temperature of the heat treatment exceeds 800° C., the carbon nanotube may be burned and disappear. The temperature of the heat treatment is preferably 420° C. or more and 750° C. or less, more preferably 560° C. or more and 690° C. or less, and further preferably 550° C. or more and 650° C. or less.

The duration time of the heat treatment is changed as appropriate depending on the temperature of the heat treatment and the thickness of the amorphous carbon-containing layer. The time of the heat treatment is preferably 1 minute or more and 120 minutes or less, and further preferably 10 minutes or more and 60 minutes or less, for example.

When the amorphous carbon-containing layer is removed from the carbon nanotube composite by laser irradiation, the carbon nanotube composite is irradiated with a laser beam under conditions of a wavelength of 200 nm or more and 1064 nm or less and a power of 10 mW or more and 10 W or less, for example. On this occasion, the carbon nanotube composite is irradiated with the laser beam under oxidizing conditions. Thereby, only the amorphous carbon-containing layer can be removed from the carbon nanotube composite while maintaining the crystallinity of the carbon nanotube.

Examples of the type of laser that can be used include Nd:YAG, He—Ne, Ar ions, excimer laser, and semiconductor laser.

As the conditions for the laser beam, a wavelength of 450 nm or more and 750 nm or less is preferable, and a power of 10 mW or more and 5 W or less is preferable.

The refined carbon nanotube obtained in the third step preferably has a D/G ratio of 0.1 or less, the D/G ratio being a ratio of a peak intensity of a D band to a peak intensity of a G band in Raman spectroscopic analysis with a wavelength of 532 nm. Thereby, the refined CNT can have a high crystallinity. Thus, the refined CNT can have a high tensile strength and a high electrical conductivity. The D/G ratio is more preferably 0.01 or less, and further preferably 0.001 or less. Although the lower limit value of the D/G ratio is not particularly limited, it can be 0 or more, for example.

The D/G ratio of the refined carbon nanotube can be confirmed by calculating the D/G ratio from the peak intensity of the D band and the peak intensity of the G band in the refined CNT Raman spectrum described in the first embodiment.

When the D/G ratio of the carbon nanotube prepared in the first step has a value of R1 and the D/G ratio of the refined carbon nanotube obtained in the third step has a value of R2, R1 and R2 preferably exhibit a relation indicated by the following expression 1.

$$-0.2 \leq (R2-R1) \leq 0.2 \qquad \text{expression 1}$$

(in the above expression 1, R1 satisfies $0 \leq R1 \leq 0.2$ and R2 satisfies $0 \leq R2 \leq 0.2$)

In a case where R1 and R2 exhibit the relation indicated by the above expression 1, the case indicates that a high crystallinity refined carbon nanotube is obtained by the third step without deteriorating the carbon nanotube in the carbon nanotube composite. R1 and R2 further preferably exhibit a relation indicated by the following expression 2 or 3.

$$-0.1 \leq (R2-R1) \leq 0.1 \qquad \text{expression 2}$$

(in the above expression 2, R1 satisfies $0 \leq R1 \leq 0.2$ and R2 satisfies $0 \leq R2 \leq 0.2$)

$$R1=R2 \qquad \text{expression 3}$$

(in the above expression 3, R1 satisfies $0 \leq R1 \leq 0.2$ and R2 satisfies $0 \leq R2 \leq 0.2$).

Examples

The present embodiment will be described more specifically with reference to examples. However, the present embodiment is not limited by these examples.

<Sample 1>
(Preparation of Carbon Nanotube)

Carbon nanotubes were fabricated using carbon nanotube manufacturing apparatus 20 shown in FIG. 5. A quartz tube having an inner diameter of 20 mm was provided within a heating furnace, and a substrate having a width of 10 mm and a pure iron sheet (purity: 4N) with a square shape having a side length of 1 cm and a thickness of 10 μm as a disintegrable catalyst were placed within the quartz tube. Then, the temperature within the heating furnace was raised to 1000° C. while supplying argon gas having an argon gas concentration of 100 volume % into the quartz tube at a rate of 60 cc/min. Thereafter, in addition to the argon gas, methane gas was supplied for 15 seconds at a rate of 3000 cc/min, and then was continuously supplied for another one hour with the flow rate (rate) being changed to less than 3000 cc/min.

Due to the supply of the methane gas, the pure iron sheet disintegrated and released catalyst particles, and the catalyst particles having a particle diameter of 30 nm to 300 nm adhered onto the substrate. When the substrate was taken out of the quartz tube and was observed with a scanning electron microscope, carbon nanotubes were formed between some of the catalyst fine particles adhered onto the substrate so as to bridge between the particles.

Of the obtained carbon nanotubes, one carbon nanotube was specified. For the carbon nanotube, a diameter thereof was measured by Raman spectroscopic analysis, and a length thereof was measured by observation with the scanning electron microscope. The carbon nanotube had a diameter of 1.8 nm and a length of 1000 μm.

The structure of the one carbon nanotube specified above was checked with a transmission electron microscope. It was confirmed that the carbon nanotube was a single-layer carbon nanotube having a linear-shaped overall external appearance, and included conical cone portions at both ends.

Raman spectroscopic analysis was performed on the one carbon nanotube specified above to obtain a Raman spectrum. The measurement conditions for the Raman spectroscopic analysis were as described in the first embodiment. When a D/G ratio was calculated from a peak intensity of a D band and a peak intensity of a G band in the Raman spectrum, the D/G ratio was 0.03.

(Fabrication of Carbon Nanotube Composite)

Next, the substrate having the one carbon nanotube specified above adhering thereto was placed within the quartz tube, and the temperature within the heating furnace was maintained at 1050° C. for five minutes while supplying a hydrocarbon-based gas having a methane gas concentration of 70 volume % into the quartz tube at a rate of 0.1 cm/sec to heat-treat the carbon nanotube. Thereby, an amorphous carbon-containing layer was formed around the carbon nanotube to obtain one carbon nanotube composite.

The one carbon nanotube composite obtained above was observed with an optical microscope to measure a diameter and a length thereof. The CNT composite had a diameter of 1 μm and a length of 1000 μm.

The structure of the one carbon nanotube composite obtained above was checked with the transmission electron microscope. As a result, it was confirmed that the carbon nanotube composite was fibrous and had a linear-shaped overall external appearance, and a layer containing amorphous carbon (amorphous carbon-containing layer) was formed on the surface of the one carbon nanotube.

It was possible to pick up the one carbon nanotube composite obtained above with tweezers and place it at a predetermined position under observation with the optical microscope. That is, the carbon nanotube composite had a good handling property.

(Fabrication of Refined Carbon Nanotube)

Next, the one carbon nanotube composite obtained above was heat-treated at a temperature of 650° C. for 60 minutes in the atmosphere.

When sample 1 was checked with the transmission electron microscope after the heat treatment, one refined carbon nanotube was able to be confirmed. It was confirmed that the refined carbon nanotube was a single-layer carbon nanotube having a linear-shaped overall external appearance, and included conical cone portions at both ends. Amorphous carbon was not confirmed on the surface of the refined carbon nanotube.

For the one refined carbon nanotube obtained above, a diameter thereof was measured by Raman spectroscopic analysis, and a length thereof was measured by observation with the scanning electron microscope. The refined carbon nanotube had a diameter of 1.8 nm and a length of 1000 μm.

Raman spectroscopic analysis was performed on the one refined carbon nanotube obtained above to obtain a Raman spectrum. The measurement conditions for the Raman spectroscopic analysis were as described in the first embodiment. When a D/G ratio was calculated from a peak intensity of a D band and a peak intensity of a G band in the Raman spectrum, the D/G ratio was 0.

When a value of (R2−R1) was calculated from a value (R1) of the D/G ratio of the carbon nanotube and a value (R2) of the D/G ratio of the refined carbon nanotube, the value of (R2−R1) was −0.03.

TABLE 1

| Sample No. | CNT Diameter (nm) | CNT Length (μm) | CNT D/G Ratio (R1) | Second Step Temperature (° C.) | Second Step Time (min) | CNT Composite Diameter (μm) | CNT Composite Length (μm) | CNT Composite D/G Ratio | Handling Property | Third Step Heat Treatment/ Laser Irradiation | Conditions | Refined CNT Diameter (nm) | Refined CNT Length (μm) | Refined CNT D/G ratio (R2) | (R2−R1) |
|---|---|---|---|---|---|---|---|---|---|---|---|---|---|---|---|
| 1 | 1.8 | 1000 | 0.03 | 1050 | 5 | 1 | 1000 | 0.7 | good | heat treatment | 650° C./ 60 min | 1.8 | 1000 | 0 | −0.03 |
| 2 | 1.8 | 1000 | 0.03 | 1050 | 5 | 1 | 1000 | 0.7 | good | heat treatment | 450° C./ 60 min | unable to be fabricated (amorphous carbon-containing layer was unable to be removed) | | | — |
| 3 | 1.8 | 1000 | 0.03 | 1050 | 5 | 1 | 1000 | 0.7 | good | heat treatment | 550° C./ 60 min | unable to be fabricated (amorphous carbon-containing layer was unable to be removed) | | | — |

TABLE 1-continued

| | CNT | | | Second Step | | CNT Composite | | | | Third Step | | Refined CNT | | | |
|---|---|---|---|---|---|---|---|---|---|---|---|---|---|---|---|
| Sample No. | Diameter (nm) | Length (μm) | D/G Ratio (R1) | Temperature (° C.) | Time (min) | Diameter (μm) | Length (μm) | D/G Ratio | Handling Property | Heat Treatment/ Laser Irradiation | Conditions | Diameter (nm) | Length (μm) | D/G ratio (R2) | (R2−R1) |
| 4 | 1.8 | 1000 | 0.03 | 1050 | 5 | 1 | 1000 | 0.7 | good | heat treatment | 700° C./ 60 min | unable to be fabricated (CNT disappeared) | | | — |
| 5 | 1.3 | 1000 | 0 | 1050 | 5 | 1 | 1000 | 0.7 | good | laser irradiation | — | 1.3 | 1000 | 0 | 0 |

<Samples 2 to 4>

In each of samples 2 to 4, carbon nanotubes were fabricated by the same method as that for sample 1. Of the obtained carbon nanotubes, one carbon nanotube was specified, and for the carbon nanotube, a diameter, a length, and a D/G ratio thereof were measured by the same methods as those for sample 1. The results are shown in the columns "diameter", "length", and "D/G ratio" of the column "CNT" in Table 1.

Heat treatment was performed on the one carbon nanotube specified above of each of samples 2 to 4 to obtain one carbon nanotube composite. The temperature and the time of the heat treatment are shown in the columns "temperature" and "time" of the column "second step" in Table 1.

The diameter and the length of the carbon nanotube composite of each of samples 2 to 4 are respectively shown in the columns "diameter" and "length" of the column "CNT composite" in Table 1.

The structure of the carbon nanotube composite of each of samples 2 to 4 was checked with the transmission electron microscope. As a result, it was confirmed that each carbon nanotube composite was fibrous and had a linear-shaped overall external appearance, and a layer containing amorphous carbon (amorphous carbon-containing layer) was formed on the surface of the one carbon nanotube.

It was possible to pick up the carbon nanotube composite of each of samples 2 to 4 with tweezers and place it at a predetermined position under observation with the optical microscope. That is, each carbon nanotube composite had a good handling property.

Next, the carbon nanotube composite of each of samples 2 to 4 was heat-treated in the atmosphere. The temperature and the time of the heat treatment are shown in the columns "temperature" and "time" of the column "third step" in Table 1.

When sample 2 was observed with the transmission electron microscope after the heat treatment, there was no change in the carbon nanotube composite, and the amorphous carbon-containing layer was confirmed on the surface of the carbon nanotube. Thus, it was confirmed that, under the heat treatment conditions for sample 2, it is not possible to remove the amorphous carbon-containing layer and to obtain a refined carbon nanotube. The reason why it is not possible to remove the amorphous carbon-containing layer may be that the heat treatment time is short.

When sample 3 was observed with the transmission electron microscope after the heat treatment, the amorphous carbon-containing layer was confirmed on the surface of the carbon nanotube, but the amount of the amorphous carbon-containing layer decreased. Thus, it was confirmed that, under the heat treatment conditions for sample 3, it is not possible to sufficiently remove the amorphous carbon-containing layer and to obtain a refined carbon nanotube. The reason why it is not possible to sufficiently remove the amorphous carbon-containing layer may be that the heat treatment time is short.

When sample 4 was observed with the transmission electron microscope after the heat treatment, neither the carbon nanotube nor the amorphous carbon-containing layer was able to be observed. Thus, it was confirmed that, under the heat treatment conditions for sample 4, the carbon nanotube also disappears together with the amorphous carbon-containing layer. The reason why the carbon nanotube disappears together with the amorphous carbon-containing layer may be that the heat treatment time is long.

<Sample 5>

In sample 5, carbon nanotubes were fabricated by the same method as that for sample 1. Of the obtained carbon nanotubes, one carbon nanotube was specified, and for the carbon nanotube, a diameter, a length, and a D/G ratio thereof were measured by the same methods as those for sample 1. The results are shown in the columns "diameter", "length", and "D/G ratio" of the column "CNT" in Table 1.

Heat treatment was performed on the carbon nanotube specified above of sample 5 to obtain one carbon nanotube composite. The temperature and the time of the heat treatment are shown in the columns "temperature" and "time" of the column "second step" in Table 1.

The diameter and the length of the carbon nanotube composite of sample 5 are respectively shown in the columns "diameter" and "length" of the column "CNT composite" in Table 1.

The structure of the carbon nanotube composite of samples 5 was checked with the transmission electron microscope. As a result, it was confirmed that the carbon nanotube composite was fibrous and had a linear-shaped overall external appearance, and a layer containing amorphous carbon (amorphous carbon-containing layer) was formed on the surface of the one carbon nanotube.

It was possible to pick up the carbon nanotube composite of sample 5 with tweezers and place it at a predetermined position under observation with the optical microscope. That is, the carbon nanotube composite had a good handling property.

Next, the obtained carbon nanotube composite was irradiated with a laser beam under conditions of a wavelength of 532 nm (the type of the laser beam: semiconductor laser) and a power of 17 mW.

When sample 5 was checked with the transmission electron microscope after the laser irradiation, one refined carbon nanotube was able to be confirmed. It was confirmed that the refined carbon nanotube was a single-layer carbon nanotube having a linear-shaped overall external appearance, and included conical cone portions at both ends. Amorphous carbon was not confirmed on the surface of the refined carbon nanotube.

For the one refined carbon nanotube obtained above, a diameter thereof was measured by Raman spectroscopic analysis, and a length thereof was measured by observation with the scanning electron microscope. The refined carbon nanotube had a diameter of 1.3 nm and a length of 1000 µm.

Raman spectroscopic analysis was performed on the one refined carbon nanotube obtained above to obtain a Raman spectrum. The measurement conditions for the Raman spectroscopic analysis were as described in the first embodiment. When a D/G ratio was calculated from a peak intensity of a D band and a peak intensity of a G band in the Raman spectrum, the D/G ratio was 0.

Both a value (R1) of the D/G ratio of the carbon nanotube and a value (R2) of the D/G ratio of the refined carbon nanotube were 0, that is, these values satisfied the relation of R1=R2.

Although the embodiments and the examples of the present disclosure have been described above, it is also originally intended to combine or variously modify the features of the embodiments and the examples as appropriate.

It should be understood that the embodiments and the examples disclosed herein are illustrative and non-restrictive in every respect. The scope of the present invention is defined by the scope of the claims, rather than the embodiments and the examples described above, and is intended to include any modifications within the scope and meaning equivalent to the scope of the claims.

REFERENCE SIGNS LIST

1: carbon nanotube composite; 2: carbon nanotube; 3: amorphous carbon; 20: carbon nanotube; 21: reaction chamber; 22: gas supplying mechanism; 23: catalyst supplying mechanism; 24: substrate holding mechanism; 25: entrance zone; 26: formation zone; 27: heater; 28: gas cylinder; 29: flow control valve; C: cone portion; D: disintegrable catalyst; P: catalyst particle.

The invention claimed is:

1. A carbon nanotube composite comprising:
   one carbon nanotube; and
   an amorphous carbon-containing layer that coats the carbon nanotube,
   the carbon nanotube having a D/G ratio of 0.1 or less, and the amorphous carbon-containing layer having a D/G ratio of 0.5 or more, the D/G ratio being a ratio of a peak intensity of a D band to a peak intensity of a G band in Raman spectroscopic analysis with a wavelength of 532 nm, and
   the carbon nanotube composite being fibrous and having a diameter of 0.1 µm or more and 50 µm or less.

2. The carbon nanotube composite according to claim 1, wherein the carbon nanotube composite has a length of 10 µm or more.

3. A method for manufacturing a carbon nanotube composite, the method comprising:
   a first step of preparing one carbon nanotube; and
   a second step of obtaining a carbon nanotube composite by coating the carbon nanotube with an amorphous carbon-containing layer, wherein the second step includes heat-treating the carbon nanotube at a temperature of 950° C. or more and 1100° C. or less in a hydrocarbon-based gas.

4. The method for manufacturing the carbon nanotube composite according to claim 3, wherein
   the carbon nanotube has a D/G ratio of 0.1 or less, the D/G ratio being a ratio of a peak intensity of a D band to a peak intensity of a G band in Raman spectroscopic analysis with a wavelength of 532 nm, and
   the carbon nanotube composite is fibrous and has a diameter of 0.1 µm or more and 50 µm or less.

5. A method for manufacturing a refined carbon nanotube, the method comprising:
   a first step of preparing one carbon nanotube;
   a second step of obtaining a carbon nanotube composite by coating the carbon nanotube with an amorphous carbon-containing layer, wherein the second step includes heat-treating the carbon nanotube at a temperature of 950° C. or more and 1100° C. or less in a hydrocarbon-based gas; and
   a third step of obtaining a refined carbon nanotube by removing the amorphous carbon-containing layer from the carbon nanotube composite.

6. The method for manufacturing the refined carbon nanotube according to claim 5, wherein
   the carbon nanotube and the refined carbon nanotube each have a D/G ratio of 0.1 or less, the D/G ratio being a ratio of a peak intensity of a D band to a peak intensity of a G band in Raman spectroscopic analysis with a wavelength of 532 nm, and
   the carbon nanotube composite is fibrous and has a diameter of 0.1 µm or more and 50 µm or less.

7. The method for manufacturing the refined carbon nanotube according to claim 6, wherein
   when the D/G ratio of the carbon nanotube has a value of R1 and the D/G ratio of the refined carbon nanotube has a value of R2, the R1 and the R2 exhibit a relation indicated by the following expression 1:

$$-0.2 \leq R2 - R1 \leq 0.2 \qquad \text{expression 1}$$

here, in the above expression 1, the R1 satisfies $0 \leq R1 \leq 0.1$ and the R2 satisfies $0 \leq R2 \leq 0.1$.

8. The method for manufacturing the refined carbon nanotube according to claim 7, wherein the third step includes heat-treating the carbon nanotube composite at a temperature of 400° C. or more and 800° C. or less under oxidizing conditions.

9. The method for manufacturing the refined carbon nanotube according to claim 8, wherein the third step includes heat-treating the carbon nanotube composite at a temperature of 560° C. or more and 690° C. or less under the oxidizing conditions.

10. The method for manufacturing the refined carbon nanotube according to claim 7, wherein the third step includes irradiating the carbon nanotube composite with a laser beam.

* * * * *

UNITED STATES PATENT AND TRADEMARK OFFICE
CERTIFICATE OF CORRECTION

PATENT NO. : 11,511,996 B2
APPLICATION NO. : 17/272802
DATED : November 29, 2022
INVENTOR(S) : Toshihiko Fujimori et al.

It is certified that error appears in the above-identified patent and that said Letters Patent is hereby corrected as shown below:

In the Claims

Claim 8, Column 22, Line 42, delete "claim 7" and insert --claim 5--.

Claim 10, Column 22, Line 51, delete "claim 7" and insert --claim 5--.

Signed and Sealed this
Eighteenth Day of April, 2023

Katherine Kelly Vidal
*Director of the United States Patent and Trademark Office*